(No Model.)
I. N. MILLS.
CORK EXTRACTOR.
No. 434,192.  Patented Aug. 12, 1890.
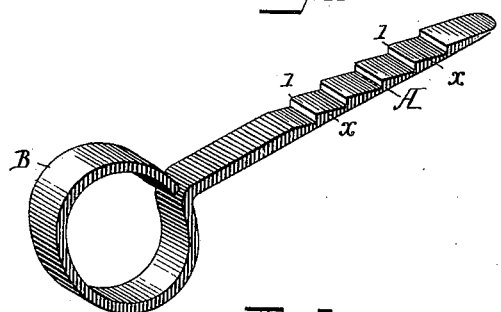
Fig. 1.
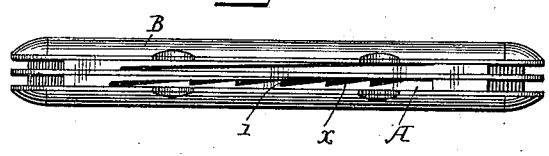
Fig. 2.
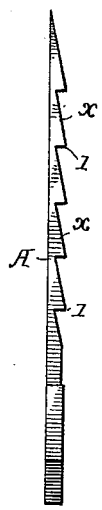
Fig. 3.
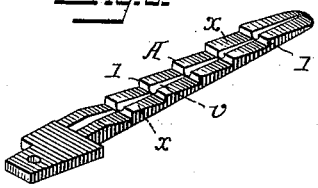
Fig. 5.
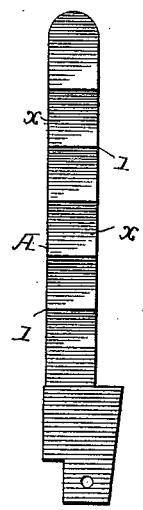
Fig. 4.
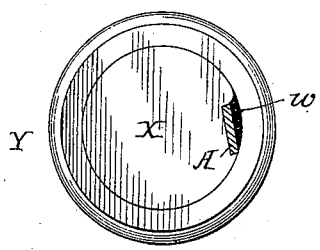
Fig. 7.  Fig. 6.
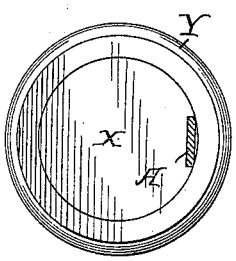
Witnesses
Jno. G. Hinkel.
W. S. McArthur
Inventor
Isaac N. Mills
By his Attorneys

UNITED STATES PATENT OFFICE.

ISAAC NEWTON MILLS, OF CLAYTON, DELAWARE.

CORK-EXTRACTOR.

SPECIFICATION forming part of Letters Patent No. 434,192, dated August 12, 1890.

Application filed February 4, 1890. Serial No. 339,157. (No model.)

*To all whom it may concern:*

Be it known that I, ISAAC NEWTON MILLS, a citizen of the United States, residing at Clayton, Kent county, State of Delaware, have invented certain new and useful Improvements in Cork-Extractors, of which the following is a specification.

My invention is a cork-extractor constructed as fully described hereinafter, so as to secure a strong and positive hold upon the cork without perforating or wounding the latter and without the necessity of using hinged tools for seizing the cork, and especially adapted for application to penknives, in which the blades are pivoted to and fold into the handle.

In the accompanying drawings, Figure 1 is a perspective view of my improved extractor. Fig. 2 is a view showing the same applied to the handle of a clasp or pen knife. Fig. 3 is an edge view of the blade detached from the knife. Fig. 4 is a face view of the blade. Fig. 5 is a perspective view of the blade, showing a modification. Figs. 6 and 7 are views illustrating the operation of the implement.

The implement consists, essentially, of a blade A and a handle B. The blade A is flat and long in proportion to its width, and the handle B is connected with one end either fixedly, as shown in Fig. 1, in which the handle is in the form of a ring, or pivoted, as shown in Fig. 2, in which the handle is that of a clasp-knife. The blade is provided upon one of its broader sides with a series of transverse shoulders $l$, the face of the blade being beveled toward the point from each shoulder, as shown, so as to provide a series of inclined or beveled faces $x$ along the whole or greater part of the blade, terminating in a face extending to the end.

The implement thus constructed is used to extract a cork X from a bottle Y, Figs. 6 and 7, by first inserting the blade as far as possible between the cork and bottle, as shown in Fig. 6, the ribbed side of the blade being toward the cork. The blade is then canted or carried inward at one edge to press such edge into the cork, as shown in Fig. 7. This has two effects—first, it opens a passage $w$ for the inlet of air or escape of gas, and, second, it compresses the cork so as to secure a better hold. The blade is then withdrawn, when the cork will move with it, being thus extracted without perforation or other injury. It will be evident that by making the implement in the form of a flat ribbed blade, as set forth, it may be as readily applied to the handle of a clasp-knife as the cutting-blades and without any special construction or alteration of the handle, while ordinary cork-screws can only be applied to such handles by cutting them away and pivoting the implement to the centers of the handles, requiring the latter to be made specially to support the blades.

In the construction shown in Fig. 5 there is a longitudinal groove $v$, which permits the passage of air or gas when the blade is introduced between the cork and bottle.

Without limiting myself, I claim—

1. A cork-extractor having a flat blade provided with transverse shoulders $l$ and beveled faces $x$ upon one of its broader sides, substantially as described.

2. A cork-extractor consisting of a flat blade provided with a series of transverse shoulders and beveled faces upon one of its broader sides, and a handle B, substantially as described.

3. The blade having transverse shoulders and beveled faces upon one of its broader sides, and a longitudinal groove $v$, substantially as described.

4. The combination of the blade A, having transverse shoulders and beveled faces upon one of its broader sides, and a case-knife handle, the blade pivoted thereto in like manner as the cutting-blade, substantially as described.

In testimony whereof I have signed my name to this specification in the presence of two subscribing witnesses.

ISAAC NEWTON MILLS.

Witnesses:
H. R. MARTINDALE,
P. P. ROBERTS.